United States Patent
Miftakhov et al.

(10) Patent No.: US 11,575,138 B1
(45) Date of Patent: Feb. 7, 2023

(54) LIQUID HYDROGEN STORAGE SYSTEM AS THERMAL BATTERY

(71) Applicant: ZeroAvia, Inc., Hollister, CA (US)

(72) Inventors: Valery Miftakhov, San Carlos, CA (US); Bob L. Mackey, San Jose, CA (US)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 17/806,471

(22) Filed: Jun. 10, 2022

(51) Int. Cl.
*H01M 8/04014* (2016.01)

(52) U.S. Cl.
CPC .... *H01M 8/04014* (2013.01); *H01M 2250/20* (2013.01)

(58) Field of Classification Search
CPC ........................ H01M 8/04014; H01M 2250/20
See application file for complete search history.

(56) References Cited

U.S. PATENT DOCUMENTS

| | | | |
|---|---|---|---|
| 2017/0233111 A1* | 8/2017 | Mata ...................... | B64D 27/24 244/171.1 |
| 2017/0256804 A1* | 9/2017 | Miller ............... | H01M 8/04753 |
| 2017/0291486 A1* | 10/2017 | Tanaka ............. | H01M 8/04776 |
| 2019/0312288 A1* | 10/2019 | Tsubouchi ........ | H01M 8/04089 |
| 2022/0009379 A1* | 1/2022 | Mikic ..................... | B60L 58/33 |
| 2022/0052361 A1* | 2/2022 | Morrison .......... | H01M 8/04597 |

* cited by examiner

*Primary Examiner* — Milton I Cano
*Assistant Examiner* — Mary G Henshaw
(74) *Attorney, Agent, or Firm* — Hayes Soloway P.C.

(57) ABSTRACT

A cooling system and cooling method for a fuel cell onboard a vehicle, wherein the fuel cell includes a gasifier configured to expand liquid hydrogen to gaseous hydrogen for feed to the fuel cell, the cooling system including a coolant system sized for less than peak power operation of the vehicle; and an auxiliary coolant system configured to provide supplemental cooling to the fuel cell, wherein the supplemental coolant system is configured to by-pass coolant to the gasifier and employ heat of gasification of the liquid hydrogen to provide supplemental cooling for the fuel cell during peak vehicle operation.

18 Claims, 2 Drawing Sheets

LIQUID HYDROGEN STORAGE SYSTEM AS THERMAL BATTERY

TECHNICAL FIELD

The present disclosure relates to heat management of fuel cells. The disclosure has particular utility in the case of PEM (Proton Exchange Membrane) fuel cell systems such as hydrogen fuel cells onboard vehicles including aircraft and will be described in connection with such utility, although other utilities are contemplated.

BACKGROUND AND SUMMARY

A fuel cell is an electrochemical cell that converts chemical energy into electrical energy by spontaneous electrochemical reduction-oxidation (redox) reactions. Fuel cells include an anode and a cathode separated by an ionically conductive electrolyte. During operation, a fuel (e.g., hydrogen) is supplied to the anode and an oxidant (e.g., oxygen or air) is supplied to the cathode. The fuel is oxidized at the anode, producing positively charged ions (e.g., hydrogen ions) and electrons. The positively charged ions travel through the electrolyte from the anode to the cathode, while the electrons simultaneously travel from the anode to the cathode outside the cell via an external circuit, which produces an electric current. The oxidant supplied to the cathode is reduced by the electrons arriving from the external circuit and combines with the positively charged ions to form water. The reaction between oxygen and hydrogen is exothermic, generating heat that needs to be removed from the fuel cell.

Fuel cells may be used as power sources for electric motors of electric vehicles and hybrid electric vehicles, including aircraft. In such applications, fuel cells oftentimes are arranged in stacks of multiple cells and connected in a series or parallel arrangement to achieve a desired power and output voltage. Cooling systems for fuel cell-powered vehicles oftentimes use an airflow generated during movement of the vehicle as a heat transfer medium. For example, an ambient airflow may be directed from outside the vehicle through an air intake of the vehicle and through one or more heat exchangers disposed within the vehicle. An airflow generated in this manner is oftentimes referred to as ram air and, when ram air is used as a cooling medium in a vehicle, the vehicle may experience increased drag, which may reduce the energy efficiency of the vehicle.

In fuel cell-powered aircraft, the power output demanded of the fuel cells—and the amount of waste heat generated by the fuel cells—is greatest during take-off and climb. 100% power output is only needed for 60-120 seconds on takeoff and initial climb to 1,000 feet. After 1,000 feet, power is reduced by 20% for the normal climb portion of the flight, and the fuel cell powerplant also operates at the higher efficiency, resulting in 30% lower heat output. Waste heat generated during operation of powered aircraft may be dissipated by positioning an air-cooled heat exchanger in an ambient airflow path through the aircraft. However, takeoff roll (from zero velocity until takeoff speed) airflow across the heat exchange surface is very low, which makes the capacity of the heat rejection system much lower during that stage of light. Moreover, directing ambient air to flow through the aircraft (instead of around the aircraft) when the aircraft is moving creates drag, with the amount of drag experienced by the aircraft being proportional to the volume of ambient air directed through the aircraft (and through the heat exchanger). In practice, the volume of the air-cooled heat exchanger (and the volume of air directed through the heat exchanger) may be selected to accommodate the most demanding cooling requirements of the aircraft, which may occur when the aircraft is operating under high load conditions, e.g., during take-off and climb. However, sizing the heat exchanger in this way may cause the aircraft to experience an unnecessarily large amount of drag when the aircraft is operating under low load conditions, e.g., during cruise, when minimal waste heat dissipation is needed. In addition, when cooling requirements are low, the presence of an oversized heat exchanger onboard the aircraft adds unnecessary weight and bulk to the aircraft. Therefore, a supplemental cooling system covering at least 30% of heat output for 120 seconds would be of significant contribution to the efficiency of hydrogen fuel cell-powered airplanes.

In accordance with the present disclosure we provide an auxiliary cooling system for a fuel cell onboard a vehicle that employs the heat of gasification of the liquid hydrogen fuel to facilitate cooling of the fuel cell. In one aspect the liquid hydrogen fuel is passed to the gasifier where the liquid hydrogen fuel is expanded to gaseous hydrogen, and the heat of gasification employed to cool the fuel cell. The gaseous hydrogen is then fed directly to the hydrogen fuel cell, or stored in an accumulator tank for future delivery to the hydrogen fuel cell. Alternatively, a portion of the liquid hydrogen is evaporated, the heat of gasification used to cool the fuel cell, and the gaseous hydrogen is released or purged safely behind the vehicle.

In one aspect of the disclosure, there is provided a cooling system for a fuel cell onboard a vehicle, wherein the fuel cell includes a gasifier configured to expand liquid hydrogen to gaseous hydrogen for feed to the fuel cell, the cooling system comprising:

a coolant system sized below that required for peak power operation of the vehicle; and an auxiliary coolant system configured to provide supplemental cooling to the fuel cell, wherein the supplemental coolant system is configured to by-pass coolant to the gasifier and employ heat of gasification of the liquid hydrogen to provide supplemental cooling for the fuel cell during peak vehicle operation.

In one aspect the auxiliary coolant system includes an accumulator tank for accumulating excess gaseous hydrogen created by the auxiliary cooling system, preferably a variable volume tank, more preferably a balloon or bellows tank.

In another aspect the auxiliary coolant system is configured to vent at least a portion of the hydrogen after gasification.

In another aspect the cooling system sized below that required for peak power operation of the vehicle comprises a phase-change coolant system.

In yet another aspect, the cooling system includes a controller configured to control operation of the coolant system sized below that required for peak power operation of the vehicle and the auxiliary coolant system. In such aspect, the controller preferably is programmed to control operation of valves and pumps of the cooling system and flow of coolant and hydrogen depending on cooling demands, and to control liquid hydrogen level, temperature and pressure of the liquid hydrogen passed to the gasifier, depending on one or more of fuel cell power requirements, fuel cell temperature, fuel cell maximum design operating temperature and Outside Air Temperature (OAT).

In a particularly preferred aspect the vehicle comprises a fuel cell powered aircraft.

The present disclosure also provides method for cooling a fuel cell aboard a vehicle, wherein the fuel cell includes a cooling system and a gasifier configured to expand liquid hydrogen to gaseous hydrogen for feed to the fuel cell, providing a coolant system sized below that required for peak power operation of the vehicle and an auxiliary coolant system configured to provide supplemental cooling to the fuel cell, wherein the auxiliary coolant system is configured to by-pass coolant to the gasifier, and activating the auxiliary coolant system during peak vehicle operation, employing heat of gasification of the liquid hydrogen.

In one aspect the auxiliary coolant system includes an accumulator tank for accumulating excess gaseous hydrogen created by the auxiliary coolant system. In such aspect the accumulator tank preferably comprises a variable volume tank, more preferably a balloon or bellows tank.

In another aspect the auxiliary coolant system is configured to vent at least a portion of the by-passed hydrogen after gasification, and including the step of venting a portion of the by-passed hydrogen.

In another aspect the coolant system sized below that required for peak power operation of the vehicle comprises a phase-change coolant system.

In yet another aspect the cooling system further includes a controller for a hydrogen fuel cell powered vehicle including a gasifier and a coolant system, wherein the coolant system includes a coolant system sized below that required for peak power operation of the vehicle, and an auxiliary coolant system which auxiliary coolant system is configured to by-pass coolant to the gasifier, and including the step of controlling operation of the cooling system based on vehicle operating conditions and environmental conditions. In such aspect the controller preferably is programmed to control operation of valves and pumps of the cooling system and flow of coolant depending on cooling demands, and to control liquid hydrogen level, temperature and pressure of the liquid hydrogen passed to the gasifier, depending on one or more of fuel cell power requirements, fuel cell temperature, fuel cell maximum design operating temperature and Outside Air Temperature (OAT).

BRIEF DESCRIPTION OF THE DRAWINGS

Further features and advantages of the instant disclosure will be seen by the following detailed description, taken in conjunction with the accompanying drawings, wherein.

DETAILED DESCRIPTION

Figure 1:
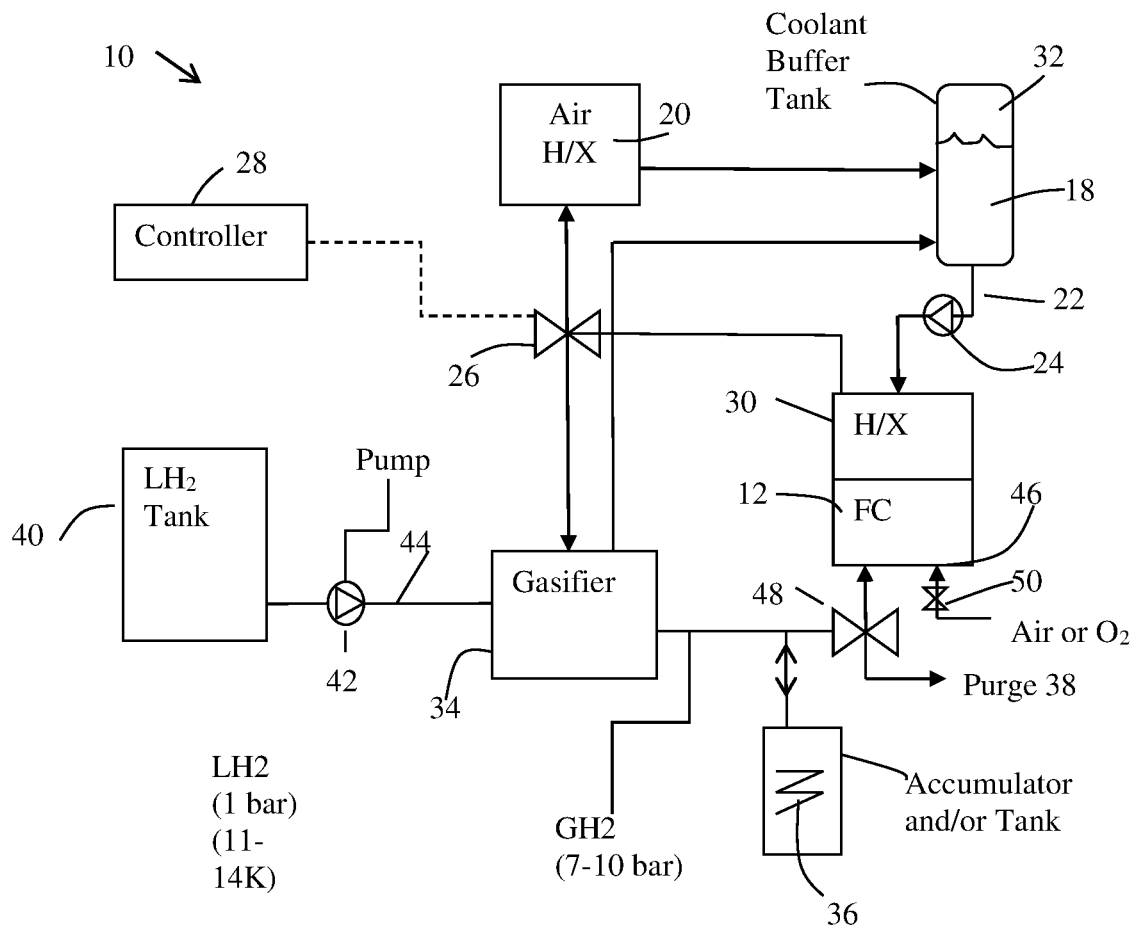
FIG. 1 is a process flow diagram of a cooling system for a fuel cell aboard a vehicle in accordance with the present disclosure.

As used herein, the term "fuel cell" is intended to include an electrochemical cell that converts the chemical energy of a fuel (typically hydrogen) and an oxidizing agent (typically oxygen) into electricity through a pair of redox reactions. There are many types of fuel cells, but they all include an anode, a cathode, and an electrolyte that allows ions, usually positively charged hydrogen ions or protons, to move between two sides of the fuel cell. At the anode a catalyst causes the fuel to undergo oxidized reactions that generate ions, typically positively charged hydrogen ions, and electrons. The ions move from the anode to the cathode through the electrolyte. At the same time, electrons flow from the anode to the cathode through an external circuit, producing direct current electricity. At the cathode, another catalyst causes ions, electrons and oxygen to react, forming water in the case of a hydrogen fuel cell, and possibly other products. Fuel cells are classified by the type of electrolyte they use and by the difference in startup electrolyte they use.

The present disclosure has particular applicability to proton-exchange membrane hydrogen fuel cells, or so-called hydrogen fuel cells, for powering aircraft, although the disclosure is not limited to hydrogen fuel cells for powering aircraft.

In our co-pending PCT Application Serial No. PCT/GB2022/051112, filed 29 Apr. 2022 we describe a cooling system for a fuel cell onboard a vehicle including aircraft which in one aspect comprises a coolant circuit defining a coolant passageway and an auxiliary evaporative cooler. The coolant circuit is configured to circulate a coolant including a phase change material through the coolant passageway and through a portion of the fuel cell to absorb heat from the fuel cell. The auxiliary evaporative cooler comprises an inlet, an outlet, a coolant channel, an airflow channel, and a selectively permeable membrane that physically separates the coolant channel from the airflow channel. The inlet is configured to receive an airflow from an ambient environment. The outlet is in fluid communication with the inlet and with the ambient environment. The airflow channel is in fluid communication with the inlet and the outlet. The coolant channel is in fluid communication with the coolant circuit. The selectively permeable membrane is selectively permeable to the phase change material in the coolant. The auxiliary evaporative cooler is configured to evaporatively cool the coolant flowing through the coolant channel by promoting evaporation and transport of the phase change material from the coolant flowing through the coolant channel, through the selectively permeable membrane, and into the airflow flowing through the airflow channel.

Alternatively, as disclosed in our aforesaid PCT Application, the cooling system for a fuel cell onboard a vehicle comprises a plenum, a coolant circuit, an auxiliary evaporative cooler, and a thermal energy storage chamber. The plenum includes an inlet and an outlet in fluid communication with an ambient environment. The inlet of the plenum is configured to receive an airflow from the ambient environment. The coolant circuit defines a coolant passageway and is configured to circulate an aqueous coolant through the coolant passageway and through a portion of the fuel cell to absorb heat from the fuel cell. The auxiliary evaporative cooler comprises a coolant channel, an airflow channel, and a selectively permeable membrane that physically separates the coolant channel from the airflow channel. The coolant channel is in fluid communication with the coolant circuit. The airflow channel is in fluid communication with the inlet and the outlet of the plenum. The selectively permeable membrane is selectively permeable to water vapor. The thermal energy storage chamber is in fluid communication with the airflow channel of the auxiliary evaporative cooler. The auxiliary evaporative cooler is configured to evaporatively cool the aqueous coolant flowing through the coolant channel by promoting evaporation and transport of water vapor from the aqueous coolant flowing through the coolant channel, through the selectively permeable membrane, and into the airflow flowing through the airflow channel. The thermal energy storage chamber is configured to store thermal energy released from the aqueous coolant flowing through the coolant channel in the form of latent heat.

Figure 2:
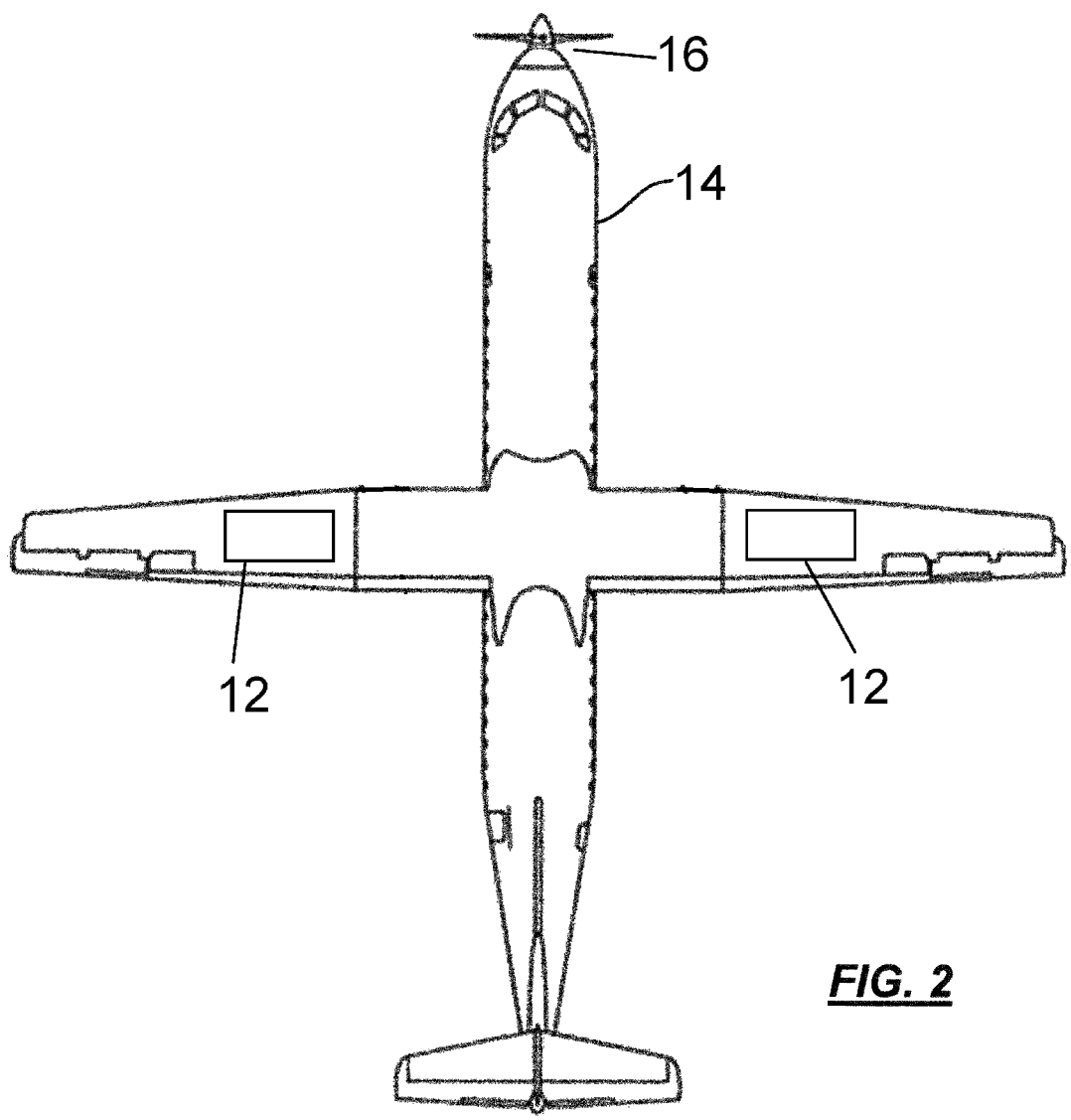
FIG. 2 is a schematic depiction of an aircraft including a fuel cell and fuel cell cooling system onboard the aircraft in accordance with the present disclosure.

FIG. 1 depicts a process flow diagram of a cooling system 10 for a hydrogen fuel cell 12. The hydrogen fuel cell or fuel cells 12 are located on board an aircraft 14 as shown in FIG. 2 that is powered at least in part by an electric motor 16. While the fuel cell or fuel cells 12 are illustrated as being located in the wings of the aircraft 14, the fuel cell(s) also may be disposed in the fuselage, engine nacelle, or any other part of the aircraft. The cooling system includes a conventional heat exchanger system configured to extract heat from the fuel cell(s) 12, for example, by transferring waste heat generated by the fuel cell(s) 12 to a cooling medium, that includes coolant 18, an air heat exchanger 20, conduits 22, pumps 24 and valves 26 under control of a controller 28 for circulating the coolant 18 through a heat exchanger 30 in contact with the fuel cell 12 to absorb heat from the fuel cell 12, and through air heat exchanger 20 into a coolant buffer tank 32. The conventional cooling system preferably is configured and sized to accommodate cooling requirements of the aircraft 14 under below that required for peak power operation of the vehicle.

A feature and advantage of the current disclosure is to provide auxiliary cooling capacity to remove excess waste heat generated by the fuel cell(s) during high load conditions, i.e., take-off and climb. To accomplish this we provide an auxiliary cooling system to supplement the conventional cooling system, that employs waste heat from the fuel cell(s) 12 to pressurize the fuel cell system gasifier 34 and/or intermediate tanks 36 to working pressure, and/or to boil off and release (purge) 38 resulting excess gaseous hydrogen safely behind the aircraft.

Referring again to FIG. 1, the auxiliary cooling system incorporates the fuel cell system liquid hydrogen tank 40 connected via a pump 42 to the gasifier 34. Liquid hydrogen tank 40 is designed to hold liquid hydrogen at ambient pressure. The liquid hydrogen is flowed via conduits 44 and pump 42 into the gasifier 34, where the liquid hydrogen is converted to gas, taking heat out of the system, and the liquid hydrogen is boiled resulting in gaseous hydrogen at working pressure for the fuel cell 12 by excess heat extracted from the fuel cell(s) 12 by heat exchanger 30. The gaseous hydrogen is then passed to the fuel cell 12 where it is reacted with oxygen fed via inlet 46. The amount of hydrogen and oxygen fed into fuel cell 12 is controlled by valves 48 and 50. Excess gaseous hydrogen from gasifier 34 may be passed to accumulator tank 36 which in some embodiments comprises a variable volume tank such as a balloon or bellows tank. Alternatively excess gaseous hydrogen may be purged behind the aircraft at 38.

Figure 3:
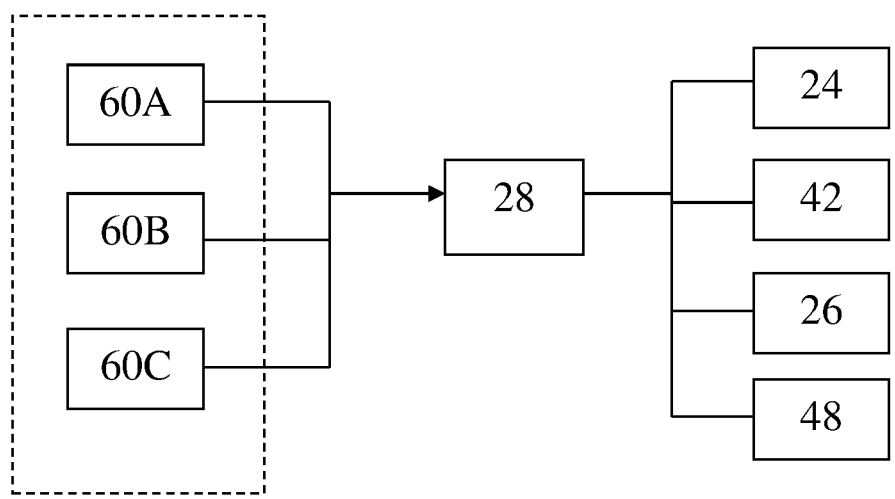
FIG. 3 is a block diagram illustrating operation of a fuel cell cooling system in accordance with the present disclosure.

FIG. 3 is a block diagram showing operation and control of the cooling system 10 in accordance with the present disclosure. The cooling system 10 includes a controller 28 that receives input of various aircraft operating conditions and environment conditions including outside air temperature, fuel cell power requirements, fuel cell temperature, liquid hydrogen level, temperature and pressure, etc., provided by sensors 60A, 60B, 60C . . . and controls the pumps 24, 42 and valves 26 and 48, to maintain the fuel cell(s) 12 at desired operating temperature.

Working Example

A Bombardier Q400 was converted to an electric powered aircraft by replacing the conventional hydrocarbon powered engines and fuel tanks, etc., with electronic motors powered by hydrogen fuel cells. The fuel tanks were filled with 500 kg of liquid hydrogen at 1 bar. The fully fueled plane required ~6 MW of aircraft-level power for take-off for 120 seconds. An auxiliary cooling system in accordance with the subject disclosure was designed to provide about 30% of the take-off cooling requirements, i.e., about ~70 KWH of heat (assuming 40% net powerplant efficiency at maximum power). To absorb 70 kwh with H2 evaporation and heating to working pressure (350K) requires ~40 kg of H2 in excess of what would have been used by the fuel cell electric powerplant to produce the corresponding mechanical propulsion output. If stored onboard at 350 bar, that would require 1.5 m3 and 400 kg of tank system—compared with about 7 m3 for the primary liquid hydrogen storage weighing 1,100 kg. If H2 is released, the additional weight requirement (extra H2+additional tank weight to cover that) is about 100 kg.

For comparison, a fuel cell powered aircraft having a conventional paraffin-based phase-change heat exchanger system would require 1,000 kg of paraffin alone (at 250 J/g standard heat of fusion plus heating for 30-50° C.). A similarly sized water ice based phase change heat exchanger system (that would require ground pre-cooling) would require 400 kg of ice, and 800 kg if liquid water is used (no ice and no pre-cooling).

Thus, even taking into account the added weight of the increased size liquid hydrogen storage tank and other elements of the auxiliary coolant system of the present disclosure, the net result is a substantial weight saving by eliminating the need for other conventional coolants.

Various changes and advantages may be made in the above disclosure without departing from the spirit and scope thereof.

What is claimed:

1. A cooling system for a fuel cell onboard a vehicle, wherein the fuel cell includes a gasifier configured to expand liquid hydrogen to gaseous hydrogen for feed to the fuel cell, the cooling system comprising:
   a coolant system sized below that required for peak power operation of the vehicle; and
   an auxiliary coolant system configured to provide supplemental cooling to the fuel cell, wherein the supplemental coolant system is configured to by-pass coolant to the gasifier and employ heat of gasification of the liquid hydrogen to provide supplemental cooling for the fuel cell during peak vehicle operation.

2. The cooling system of claim 1, wherein the auxiliary coolant system includes an accumulator tank for accumulating excess gaseous hydrogen created by the auxiliary cooling system.

3. The cooling system of claim 2, wherein the accumulator tank comprises a variable volume tank.

4. The cooling system of claim 3, wherein the variable volume tank comprises a balloon or bellows tank.

5. The cooling system of claim 1, wherein the auxiliary coolant system is configured to vent at least a portion of the hydrogen after gasification.

6. The cooling system of claim 1, wherein the coolant system sized below that required for peak power operation of the vehicle comprises a phase-change coolant system.

7. The cooling system of claim 1, further including a controller configured to control operation of the coolant system sized below that required for peak power operation of the vehicle and operation of the auxiliary coolant system.

8. The cooling system of claim 7, wherein the controller is programmed to control one or more of {operation of valves and pumps of the cooling system}, {flow of coolant and hydrogen depending on cooling demands}, and {liquid hydrogen level, temperature and pressure of the liquid hydrogen passed to the gasifier, depending on one or more of fuel cell power requirements, fuel cell temperature, fuel cell maximum design operating temperature and Outside Air Temperature (OAT)}.

9. The cooling system of claim 1, wherein the vehicle comprises a fuel cell powered aircraft.

10. A method for cooling a fuel cell aboard a vehicle, wherein the fuel cell includes a cooling system and a gasifier configured to expand liquid hydrogen to gaseous hydrogen for feed to the fuel cell, comprising the steps of:
providing a coolant system sized below that required for peak power operation of the vehicle and an auxiliary coolant system configured to provide supplemental cooling to the fuel cell, wherein the auxiliary coolant system is configured to by-pass coolant to the gasifier, and
activating the auxiliary coolant system during peak vehicle operation, employing heat of gasification of the liquid hydrogen to provide supplemental cooling for the fuel cell.

11. The method of claim 10, wherein the auxiliary coolant system includes an accumulator tank for accumulating excess gaseous hydrogen created by the auxiliary coolant system.

12. The method of claim 11, wherein the accumulator tank comprises a variable volume tank.

13. The method of claim 12, wherein the variable volume tank comprises a balloon or bellows tank.

14. The method of claim 10, wherein the auxiliary coolant system is configured to vent at least a portion of the hydrogen after gasification, and including the step of venting a portion of the hydrogen.

15. The method of claim 10, wherein the coolant system sized below that required for peak power operation of the vehicle comprises a phase-change coolant system.

16. The method of claim 10, wherein the cooling system further includes a controller configured to control operation of the coolant system sized below that required for peak power operation of the vehicle and the auxiliary coolant system, and including the step of controlling operation of the cooling system based on vehicle operating conditions and environmental conditions.

17. The method of claim 16, wherein the controller is programmed to control operation of valves and pumps of the cooling system and flow of coolant depending on cooling demands, and to control liquid hydrogen level, temperature and pressure of the liquid hydrogen passed to the gasifier, depending on one or more of fuel cell power requirements, fuel cell temperature, fuel cell maximum design operating temperature and Outside Air Temperature (OAT).

18. The method of claim 10, wherein the vehicle comprises a fuel cell powered aircraft.

* * * * *